US010595221B2

(12) United States Patent
Johansson et al.

(10) Patent No.: US 10,595,221 B2
(45) Date of Patent: Mar. 17, 2020

(54) METHOD OF MDT INFORMATION LOGGING AND REPORTING

(75) Inventors: Per Johan Mikael Johansson, Kungsangen (SE); Yih-Shen Chen, Hsinchu (TW); Chia-Chun Hsu, Taipei (TW); Michael Roberts, Neuilly sur Seine (FR)

(73) Assignee: HFI INNOVATION, INC., Zhubei, Hsinchu County (TW)

(*) Notice: Subject to any disclaimer, the term of this patent is extended or adjusted under 35 U.S.C. 154(b) by 0 days.

(21) Appl. No.: 13/373,067

(22) Filed: Nov. 2, 2011

(65) Prior Publication Data

US 2012/0106356 A1 May 3, 2012

Related U.S. Application Data

(60) Provisional application No. 61/409,737, filed on Nov. 3, 2010.

(51) Int. Cl.
*H04W 24/10* (2009.01)
*H04W 24/08* (2009.01)
(Continued)

(52) U.S. Cl.
CPC ........... *H04W 24/10* (2013.01); *H04W 24/08* (2013.01); *H04W 24/00* (2013.01); *H04W 52/14* (2013.01)

(58) Field of Classification Search
CPC ................. H04W 24/10; H04W 24/08; H04W 24/00–10; H04W 24/02; H04W 64/00;
(Continued)

(56) References Cited

U.S. PATENT DOCUMENTS

| 6,477,376 B1 | 11/2002 | Carter ........................... 455/446 |
| 7,031,722 B2 | 4/2006 | Naghian .................... 455/456.1 |

(Continued)

FOREIGN PATENT DOCUMENTS

| CN | 1856149 A | 11/2006 |
| CN | 101237685 A | 8/2008 |

(Continued)

OTHER PUBLICATIONS

International Search Report and Written Opinion of International Search Authority for PCT/CN2011/081749, dated Feb. 2, 2012 (11 pages).

(Continued)

*Primary Examiner* — Khaled M Kassim
*Assistant Examiner* — Najeeb Ansari
(74) *Attorney, Agent, or Firm* — Oblon, McClelland, Maier & Neustadt, L.L.P.

(57) ABSTRACT

A method of MDT information logging and problem event reporting is provided. The method supports provisioning of reference events to enable correlation of system time and the problem occurrence. In one embodiment, a problem event report includes time information directly or indirectly related to a reference event. A method of handling battery condition is also provided. The method supports autonomously suspending or resuming OAM activities in MDT based on predefined battery condition. In one embodiment, a testable battery condition handling is designed for MDT logging.

10 Claims, 7 Drawing Sheets

(51) Int. Cl.
  *H04W 52/14* (2009.01)
  *H04W 24/00* (2009.01)
(58) Field of Classification Search
  CPC . H04W 16/18; H04W 24/04; H04W 36/0088; H04W 76/028; H04W 36/0083; H04W 36/08; H04W 28/04; H04W 36/0055; H04W 36/0094; H04W 36/30; H04W 36/36
  USPC .................................................. 370/241–242
  See application file for complete search history.

(56) References Cited

U.S. PATENT DOCUMENTS

| | | | |
|---|---|---|---|
| 70,111,746 | | 5/2007 | Anderson ..................... 455/522 |
| 2001/0011032 | A1 | 8/2001 | Suzuki ........................ 455/574 |
| 2004/0038687 | A1 | 2/2004 | Nelson ...................... 455/456.1 |
| 2004/0097237 | A1 | 5/2004 | Aoyama ....................... 455/445 |
| 2004/0153830 | A1 | 8/2004 | Cebula et al. ............... 714/38.14 |
| 2005/0124372 | A1 | 6/2005 | Lundby et al. .............. 455/522 |
| 2005/0201280 | A1 | 9/2005 | Lundby et al. .............. 370/229 |
| 2005/0249148 | A1 | 11/2005 | Nakamata et al. ........... 370/328 |
| 2007/0149129 | A1 | 6/2007 | Das et al. ................... 455/67.11 |
| 2007/0153687 | A1 | 7/2007 | Attar et al. ................... 370/229 |
| 2007/0274222 | A1 | 11/2007 | Kanno ......................... 370/241 |
| 2009/0143065 | A1 | 6/2009 | Mattila ........................ 455/423 |
| 2009/0175187 | A1 | 7/2009 | Jersenius et al. ............ 370/252 |
| 2009/0257353 | A1* | 10/2009 | Song ..................... H04W 24/02 370/241 |
| 2009/0274134 | A1 | 11/2009 | Wang et al. ................. 370/338 |
| 2010/0054143 | A1 | 3/2010 | Kokku et al. ................ 370/252 |
| 2010/0099415 | A1 | 4/2010 | Li et al. ....................... 455/436 |
| 2010/0105336 | A1 | 4/2010 | Attar et al. ................. 455/67.11 |
| 2010/0190488 | A1* | 7/2010 | Jung ..................... H04W 24/10 455/424 |
| 2010/0311437 | A1 | 12/2010 | Palanki et al. ............. 455/456.1 |
| 2010/0323683 | A1 | 12/2010 | Kazmi et al. ............... 455/422.1 |
| 2010/0330921 | A1* | 12/2010 | Kim et al. .................. 455/67.11 |
| 2011/0194441 | A1* | 8/2011 | Jung et al. ................... 370/252 |
| 2011/0195668 | A1* | 8/2011 | Lee et al. ................... 455/67.11 |
| 2011/0201279 | A1* | 8/2011 | Suzuki et al. .............. 455/67.11 |
| 2011/0201324 | A1* | 8/2011 | Persson ................ H04W 24/10 455/422.1 |
| 2011/0281525 | A1 | 11/2011 | Furuskär et al. .......... 455/67.11 |
| 2012/0039365 | A1* | 2/2012 | Suzuki et al. ................ 375/147 |
| 2012/0064886 | A1* | 3/2012 | Kim et al. .................... 455/423 |
| 2012/0092998 | A1* | 4/2012 | Chang .................. H04W 24/10 370/241 |
| 2012/0106370 | A1* | 5/2012 | Radulescu ........ H04W 36/0083 370/252 |
| 2012/0135736 | A1* | 5/2012 | Sebire et al. ................. 455/436 |
| 2012/0165025 | A1 | 6/2012 | Fahldieck .................... 455/440 |
| 2012/0182879 | A1* | 7/2012 | Tamura et al. ............... 370/242 |
| 2012/0282968 | A1 | 11/2012 | Toskala et al. ............... 455/517 |
| 2012/0309404 | A1* | 12/2012 | Suzuki et al. ................ 455/450 |
| 2012/0315890 | A1* | 12/2012 | Suzuki et al. ............... 455/422.1 |
| 2013/0065535 | A1* | 3/2013 | Zhou et al. ................. 455/67.11 |
| 2013/0095818 | A1* | 4/2013 | Levy et al. ................... 455/423 |
| 2013/0099501 | A1 | 4/2013 | Focchi et al. .................. 290/52 |
| 2013/0122891 | A1* | 5/2013 | Palm .................... H04W 24/10 455/422.1 |
| 2013/0137379 | A1* | 5/2013 | Jung .................... H04W 24/10 455/67.11 |
| 2013/0171986 | A1* | 7/2013 | Shimizu ....................... 455/423 |
| 2013/0176884 | A1 | 7/2013 | Chang ......................... 370/252 |
| 2013/0178204 | A1* | 7/2013 | Zhang et al. ................. 455/423 |
| 2013/0188510 | A1* | 7/2013 | Siomina et al. .............. 370/252 |
| 2013/0189973 | A1* | 7/2013 | Chang et al. ................. 455/423 |

FOREIGN PATENT DOCUMENTS

| | | |
|---|---|---|
| CN | 101296433 A | 10/2008 |
| CN | 101345822(A) | 1/2009 |
| CN | 101534518(A) | 9/2009 |
| CN | 101636000 A | 1/2010 |
| CN | 101827372 A | 9/2010 |
| CN | 101841835 | 9/2010 |
| CN | 101841835 A | 9/2010 |
| EP | 2053896 A1 | 4/2009 |
| EP | 2437540 A1 | 4/2012 |
| JP | 2001217927 | 8/2001 |
| JP | 2004166056 | 6/2004 |
| JP | 2009521870 | 6/2009 |
| JP | 2009232197 | 10/2009 |
| JP | 2010171474 | 8/2010 |
| JP | 2013531964 | 8/2013 |
| JP | 2013542675 | 11/2013 |
| WO | WO2002093952 | 11/2002 |
| WO | WO2005096516 | 10/2005 |
| WO | WO2007047359 | 4/2007 |
| WO | WO2009011065 | 1/2009 |
| WO | WO2010051513 A2 | 5/2010 |
| WO | WO2010054364 A1 | 5/2010 |
| WO | WO2011016804 A1 | 2/2011 |
| WO | WO2011157292 A1 | 12/2011 |
| WO | WO2012019652 A1 | 2/2012 |

OTHER PUBLICATIONS

USPTO, office action for related U.S. Appl. No. 13/373,070 dated Jul. 19, 2013 (21 pages).
JPO, Office Action for JP patent application 2013-536993 dated Apr. 2, 2014 (4 pages).
JPO, Office Action for JP patent application 2013-536992 dated Apr. 2, 2014 (5 pages).
SIPO, Examination Search Report for CN patent application 201180007094.X dated May 8, 2014 (7 pages).
SIPO Search Report for the CN patent application 201180006543.9 dated Jan. 21, 2015 (6 pages).
JPO, Office Action for the JP patent application 2014-158724 dated Jun. 16, 2015 (4 pages).
3GPP TS 37.320 V.1.1.10 (Oct. 2010); 3rd Generation Partnership Project; Technical Specification Group TSG RAN Universal Terrestrial Radio Access (UTRA) and Evolved Universal Terrestrial Radio Access (E-UTRA); Radio Measurement Collection for Minimization of Drive Tests (MDT); Overall Description; Stage 2 (release 10).
R4-093737 3GPP TSG-RAN WG4 #52bis; Qualcomm Europe; Implementation Impact of MDT; Miyazaki, Japan dated Oct. 12-16, 2009 (2 pages).
USPTO, Office Action for related U.S. Appl. No. 14/251,910 dated Jul. 2, 2015 (18 pages).
USPTO, Office Action for related U.S. Appl. No. 14/251,936 dated Jul. 1, 2015 (11 pages).
EPO, Search Report for the EP patent application 11837586.4 dated Oct. 30, 2015 (6 pages).
3GPP TSG-RAN WG2 Meeting #60 R2-074682, Ericsson et al., Uplink Scheduling Information in E-UTRAN, Juju, South Korea dated Nov. 5-9, 2007 (4 pages).
3GPP TS 36.321 V8.6.0 (Jun. 2009), 3rd generation Partnership Project; Technical Specification Group Radio Access Network; Evolved Universal Terrestrial Radio Access (E-UTRA) Medium Access Control (MAC) Protocol Specification (Release 8) *Section 5.4.6 Power Headroom Reporting*.
EPO, Search Report for the EP patent application 11837588.0 dated Nov. 12, 2015 (8 pages).
3GPP TSG RAN WG2 #70bis R2-103903, Ericsson et al., Time Stamp Mechanism for Logged MDT, Stockholm, Sweden dated May 28-Jun. 2, 2010 (2 pages).
3GPP TSG RAN WG2 #70bis R2-103859, Vodafone, Time Stamp Information for Logged MDT, Stockholm, Sweden dated Jun. 28-Jul. 2, 2010 (6 pages).
3GPP TSG-RAN WG3 Meeting #71 R2-104670, Huawei et al., Definition of Time Stamp Information, Madrid, Spain dated Aug. 23-27, 2010 (4 pages).
3GPP TSG-RAN WG2 Meeting #70 R2-102909, TD Tech, Time Stamp Achievement and Reporting in MDT, Montreal, Canada dated May 10-14, 2010 (4 pages).

(56) References Cited

OTHER PUBLICATIONS

3GPP TR 36.805 V2.0.0 (Nov. 2009) 3rd Generation Partnership Project; Technical Specification Group Radio access Network; Study on minimization of Drive-Tests in Next Generation Networks; (Release 9).
JPO, Office Action for the JP patent application 2015-094129 dated Apr. 13, 2016 (4 pages).
3GPP TSG-RAN Wg2 Meeting #71bis R2-105675, Alcatel-Lucent, MDT-issues for discussion, Xi'An, China dated Oct. 11-15, 2010 (3 pages).
3GPP TSG-RAN WG1 #62bis R1-105272, CMCC, Discussion of the possibility of using subframe offset for interference avoidance in TDD systems, Xi'An, China dated Oct. 11-15, 2010 (6 pages).
3GPP TSG RAN WG1 Meeting #61bis R1-103688, New Postcom, Need and feasibility of using different uplink-downlink configurations for TDD HeNBs in Heterogeneous Networks, Dresden Germany dated Jun. 28-Jul. 2, 2010 (6 pages).
USPTO, Office Action for related U.S. Appl. No. 14/251,936 dated Aug. 17, 2016 (11 pages).
SIPO, Search Report for the CN patent application 201510071771.4 dated Jul. 3, 2017 (6 pages).
Analysis of CDMA Networking Optimization Method, School of Electrical Engineering, Southwest Jiaotong University et al., Journal of Sichuan University of Science & Engineering (Natural Science Edition) vol. 18 No. 1, Mar. 2005. (Only abstract in English is available *p. 5, last paragraph*).
Chinese First Office Action dated Jun. 5, 2018 in Application No. 201610085864.7 with English translation, 13 pages.
China First Office Action dated Sep. 4, 2018 in Application No. 201610073024.9 (with English translation), 15 pages.

* cited by examiner

METHOD OF MDT INFORMATION LOGGING AND REPORTING

CROSS REFERENCE TO RELATED APPLICATIONS

This application claims priority under 35 U.S.C. § 119 from U.S. Provisional Application No. 61/409,737, entitled "Method of MDT Information Logging and Reporting," filed on Nov. 3, 2010, the subject matter of which is incorporated herein by reference.

TECHNICAL FIELD

The disclosed embodiments relate generally to problem event reporting and minimization of drive test (MDT), and, more particularly, to information logging and reporting for problem event reporting and Minimization of Drive Test (MDT).

BACKGROUND

The $3^{rd}$ Generation Partnership Project (3GPP) long term evolution (LTE) system, introduced as 3GPP release 8, is an improved universal mobile telecommunication system (UMTS). An LTE system offers high peak data rates, low latency, improved system capacity, and low operating cost resulting from simple network architecture. In the LTE system, an evolved universal terrestrial radio access network (E-UTRAN) includes a plurality of evolved Node-Bs (eNBs) communicating with a plurality of mobile stations, referred as user equipment (UE). 3GPP introduces new features to help LTE system operators further optimize network planning in a cost-effective way. Problem event reporting and MDT are two such features where UEs detect problem events, log measurement and send such information to their serving eNBs. At the same time, MDT has been introduced for the legacy UMTS system, It is expected that problem event reporting may also be introduced in the future.

Current 3GPP standard supports reporting of some problem events, such as Radio Link Failure (RLF) reporting, which helps with mobility robustness optimization, and Random Access Channel (RACH) attempt failure reporting, which helps with RACH optimization. Typical problem events that are relevant to network optimization include RLF, RACH failure, handover failure, call setup failure and other failures that may result from network planning issues. Furthermore, problem events happened in UE idle mode, such as UE entering out-of-service state, or UE having cell reselection failure, etc., are also important information that may help operators understand a possible network-planning problem.

For optimization purposes, it is important to know whether a problem occurred due to network coverage issues or due to Radio Resource Management (RRM) configuration issues. Therefore, a logged problem event report needs to be correlated with a concurrent system state and network configuration. The correlation between the problem event report and the concurrent system and network condition becomes even more important when automatic optimization is used, where the time between observing problems and making correctional configuration changes could be short. Some problem events with high significance, such as RLF, handover failure and initial access failure, are rare in a working network. UEs log these events and are expected to deliver the logged information to the network soon after their occurrences. For example, in 3GPP Release 9, a UE indicate if it has information about RLF failure and RACH report in the Radio Resource Control (RRC) re-establishment procedure. The network must fetch the logged information before UE establishes another connection. In general, the system uses time stamping as a means to correlate observed problems, e.g. problems observed in different network nodes such as eNB and Mobility Management Entity (MME). For the moment the details of post-processing failure event reports from the UE has not been standardized. From current principles it can anyway be assumed that network would use time stamp to correlate a problem event report with a network condition. Time stamping is an important way to correlate a problem event report with the concurrent network condition.

In current systems, there are two main methods to time stamp observations and measurements done by a mobile device. The first method is to add a time stamp to a reported observation by the network. Such method is used for problem events when the problem event report is delivered immediately after the problem event occurs, such as RLF report and RACH report for 3GPP rel-8 and 9 systems. In these cases, a reporting UE does not add time stamps to its problem event report. Instead, the network, upon receiving these reports, adds time stamp to them. This method is similar to immediate MDT defined in the 3GPP standard. The second current art method would be to add a time stamp to a problem event report by the UEs, similar to logged MDT. Furthermore similar to logged MDT, it is assumed that the radio connection layers of a UE do not have access to accurate absolute time. To be able to add a time stamp for logged MDT, a UE receives a reference time from the network when configured for logging. The UE then increases the value of the reference time automatically and adds the resulting time stamp to a problem event report upon detecting a problem event. This method is used for logged MDT in the 3GPP standard. It is not used for problem event reporting because there is no prior configuration for problem event reporting. It is also not suitable to introduce such configuration, because due to the low rate of problem events in normal operation all or almost all UE should all the time be ready to record problem event information, and keeping all UEs configured, including keep UE time up to date would involve significant signaling overhead. Both of the time stamping methods have their limitations and cannot meet the requirement of the evolving LTE systems.

With progress made in the 3GPP release-10 standard, the above traditional time stamping methods do not work efficiently in the evolving LTE systems. In certain scenarios, these methods do not work at all. For example, the above methods have problem working in an environment with inter-technology mobility. 3GPP defines inter-RAT (Radio Access Technology) mobility and inter-Technology mobility. The former refers to mobility between LTE and earlier 3GPP technologies. The latter refers to mobility between 3GPP technologies and non-3GPP technologies. Under LTE standard, UEs can move between different RATs. In network deployments where a first RAT provides spotty coverage and a second RAT provides overall coverage, inter-RAT mobility from the first to the second RAT at failure events would be common. Normally, different RAT has different Operations, Administration and Maintenance (OAM) systems. Therefore, a UE would not report problem event information in a RAT that is different from the one where the problem occurred. In such scenarios, the UE should store the problem event information when connecting to another RAT so that the problem event information can be retrieved by the system in the original RAT where the problem occurred. Such feature, however, requires improved time information to correlate the delayed problem event report with its concurrent network condition.

In addition to problem event reporting, 3GPP also introduces MDT to help with network optimization. MDT feature enables UEs to perform OAM activities, such as neighborhood detection, measurements, logging and recording for OAM purposes, which include RRM and optimization purposes. MDT helps with network optimization traditionally done by costly drive testing. In current systems, MDT has the same time stamping problems like the problem event reporting. Furthermore, since MDT logging is high battery consuming, it poses problems in battery condition handling.

A UE running on limited power source, such as battery, needs to concern battery condition handling when enabling MDT logging. MDT logging can be highly battery consuming. The MDT feature assumes that a UE can be configured for MDT in a certain part of the network that supports MDT, and then performs MDT measurements while in a part of the network that does not support MDT. Because MDT cannot be reconfigured in the part of the network not supporting MDT, the logging duration in a MDT logging configuration could be set long so that a UE can perform MDT measurement and MDT logging even when out of the MDT-supported area. Furthermore, in order to better correlate the MDT measurements with UE location, the network may initiate UE location determination by Global Navigation satellite System (GNSS), which consumes a significant amount of power.

Battery condition has high impact on user perception. Power consumption in active mode is always higher than in idle mode. It is commonly understand that a user would have control over battery usage to keep active session short and close down active applications if he/she would want to conserve battery. Therefore, users should have the control over the MDT application running on its phone to shut down the application as they see the need, just like other application. Thus, in order to support good user perception, the UE need to implement battery handling for MDT logging and measuring that may take place in active or idle mode. It should follow the principle of most application procedures initiated in idle mode with autonomous actions based on the battery condition, rather than being commanded by the network. In current systems, when a 3GPP UE is turned off, it is assumed that the UE loses all stored MDT information. A UE will automatically turn off when it detects critically low battery condition. Therefore, improvement is desired to better handle low battery condition for such high power consuming activities like MDT logging. Furthermore, such battery condition handling needs to have measurable ways so that the condition is testable.

SUMMARY

A method of MDT information logging and problem event reporting is provided. The method supports provisioning of reference events to enable correlation of system time and the problem occurrence. In one embodiment, a problem event report includes time information directly or indirectly related to a reference event. A method of handling battery condition is also provided. The method supports autonomously suspending or resuming OAM activities in MDT based on predefined battery condition. In one embodiment, a testable battery condition handling is designed for MDT logging.

Embodiments of the present invention provide method of using reference event to provide relative time information in problem event reporting, including: obtaining event configuration information by a user equipment (UE), wherein the event configuration information is associated with a plurality of reference events in a wireless network; detecting a problem event; logging the problem event and thereby generating a problem event report; and sending the problem event report, wherein the problem event report provides relative time information that is related to occurrences of the configured reference events. Based on the relative time information, the network can deduce the absolute time of the problem event. The relative time information simplifies the procedure for problem event reporting.

In other embodiments of the present invention, methods of using battery condition to manage OAM activities include: monitoring a condition on a battery of a user device (UE); detecting a low battery condition; taking an autonomously suspending action on Operations, Administration, and Maintenance (OAM) activities when detecting the low battery condition; and taking an autonomously resuming action on OAM activities when the UE exits the low battery condition. The improved battery condition handling and the innovative steps of suspending and resuming OAM activities based on the battery condition helps to better use MDT for network planning and improves user perception.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
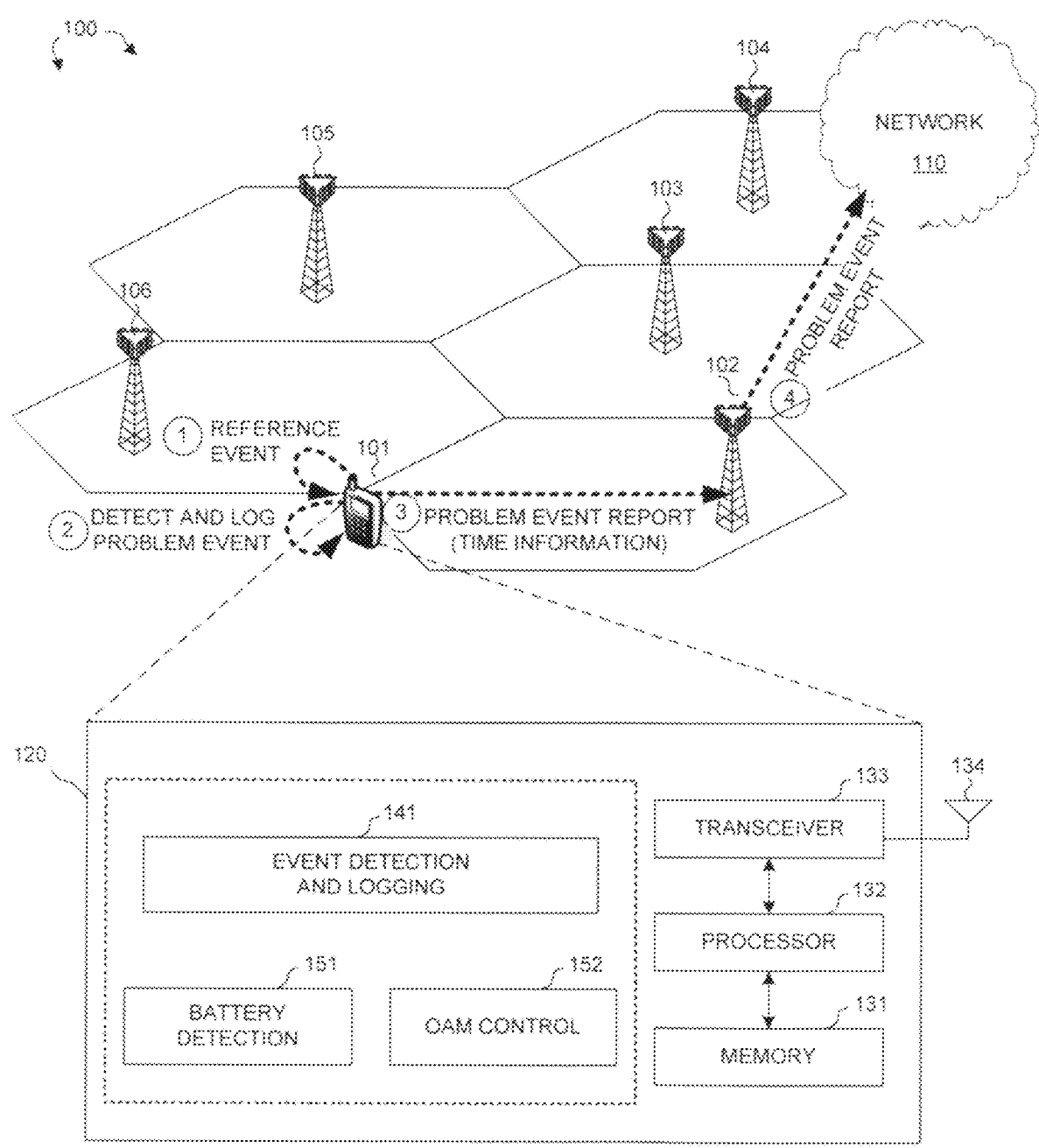
FIG. 1 schematically shows a diagram of a wireless communication system and an exemplary block diagram of a UE in accordance with one novel aspect.

FIG. 1 schematically shows a diagram of a wireless communication system 100 and an exemplary block diagram 120 of a UE 101 in accordance with one novel aspect. FIG. 1 shows an exemplary block diagram 120 of UE 101 that supports some embodiments of the present invention. Antenna 134 transmits and receives RF signals. Transceiver module 133, coupled with antenna 134, receives RF signals from antenna 134, converts them to baseband signals and sends them to processor 132. Transceiver 133 also converts received baseband signals from the processor 132, converts them to RF signals, and sends out to antenna 134. Processor 132 processes the received baseband signals and invokes different functional modules to perform features in UE 101. Memory 131 stores program instructions and data to control the operations of UE 101.

FIG. 1 also shows three functional modules 141, 151 and 152, which carry out embodiments of the present invention. Event detection and logging module 141 detects certain configured or embedded events, such as problem events in the system and reference events from configuration information. Module 141 upon detecting relevant event may log such event and other information according to configuration information or embedded instructions. Battery detection module 151 detects testable battery conditions and processes such conditions to generate battery information. Such battery information can be fed into OAM control module 152, where it may suspend or resume some predefined OAM activities based on the battery information and other relevant information. The functional modules in block diagram 120 are designed to carry out embodiments of the present invention, which optimizes network planning. The following section discusses in details of embodiments of the present invention.

Relative Time

As illustrated in FIG. 1, an LTE system 100 includes a plurality of eNBs: 102, 103, 104, 105 and 106. UE 101 connects with eNB 102, which may send configuration information to UE 101 and may receive problem event report from UE 101. The eNBs communicating with network 110 can send or forward UE problem event report to network 110. In one embodiment of the invention, relative time information is used for problem event report. This method is shown in FIG. 1. It uses a relative time that is related to the problem event and therefore, does not require UE 101 to know the exact reference time. Instead, a network element, such as eNB 102 or network 110 can deduce the absolute time of the problem event based on relative time information set by UE 101 and a commonly known reference event.

eNB 102 and UE 101 may have a set of predefined commonly understanding reference events. The reference may be obtain through configuration process or through embedded instructions. The reference events can be any commonly known event that gives a common view on the timing of the transmitting or receiving of the problem event between UE 101 and network elements such as eNB 102 and network 110. For example, in the case of Automatic Repeat Request (ARQ) of Hybrid ARQ (HARQ) transmission, the common event known to both UE 101 and eNB 102 could be the start of a transmission, or the time of requesting or granting of uplink (UL) resources for the transmission that carries the problem event report or some other indication related to the problem event or problem event report. Another example of a reference event can be a successful connection established between UE 101 and eNB 102.

In Step (1), as shown in FIG. 1, a configured or commonly known reference event occurs. UE 101 starts to measure relative time. At Step (2), UE 101 detects a problem event. UE 101 then logs the duration from the time of the reference event and the time of the problem event as a relative time. UE 101 may either directly use this relative time as time information or use the relative time in some other ways to generate the time information. In some embodiments of the present invention, UE may detect a problem event first and detect a reference event later. The occurrence of reference event and problem event can be in any sequence.

In Step (3), UE 101 includes this time information in a problem event report and sends the problem event report to eNB 102. At Step (4), eNB 102 sends the problem event report to network 110. Based on the time information in the problem event report and the knowledge of the absolute time of the reference event, eNB 102 or network 110 can deduce the absolute time of the problem event. This relative time information can simplify the procedure for problem event reporting. It is very easy for UE 101 to measure relative time because such feature is already supported by UE chipsets. It also simplifies the network process because the network can easily deduce absolute time stamp from the time information in the UE problem event report.

Although FIG. 1 only shows a specific example of relative time method for problem event reporting, a person skilled in the art would understand that such method could be used in other similar schemes, such as logged MDT.

Figure 2:
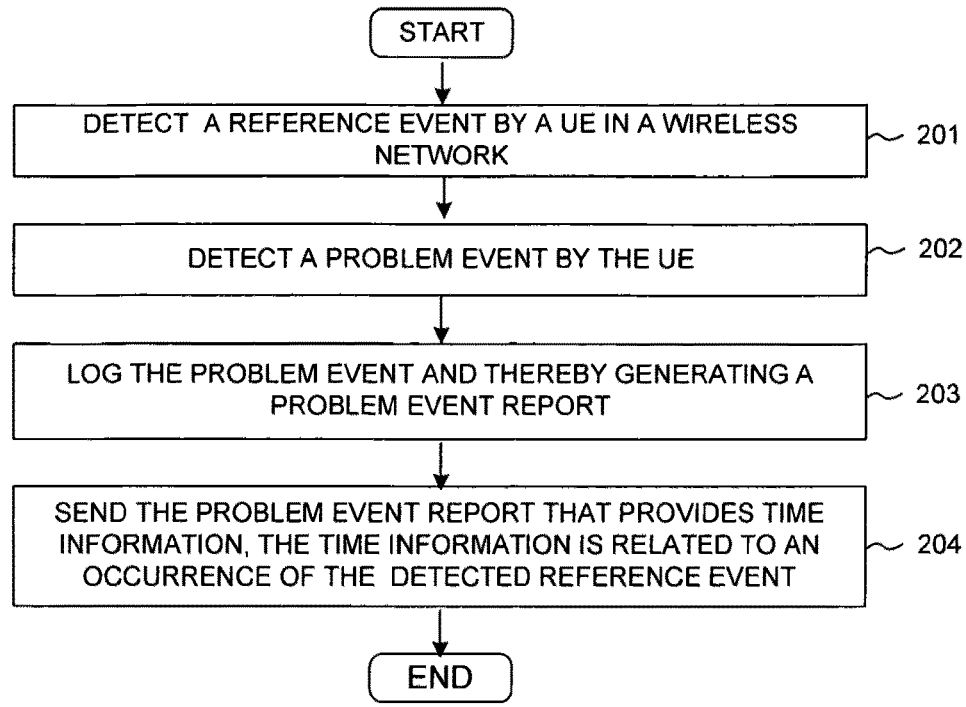
FIG. 2 shows a flow chart of a method of using relative time for problem event report.

FIG. 2 shows a flow chart of a method using relative time for problem event report in a wireless communication system. At Step 201, a UE detects a reference event. Examples of such reference events are presented in the following discussion. The UE and at least one network element would both understand the reference event. An example of a network element is the serving eNB of the UE or any other network node in the wireless communication system. Such mutual understanding can be achieved by using configuration messages or can be embedded in the functional modules of both the UE and the network element.

At Step 201, the UE detects a problem event. A typical problem event would be radio link failure, RACH failure, handover failure, or call setup failure. It can also be cell reselection failure or other idle mode events. The UE should be able to adapt to detect additional problem events.

At Step 203, the UE upon detecting the problem event would log the problem event and generate a problem event report. This problem event report will include time information that is related to a reference event. In one embodiment of the present invention, the time information is the time duration between the problem event and a configured reference event known to both the UE and the network element. At Step 204, the UE sends the problem event report that provides the time information, where the time information is related to an occurrence of the detected reference event. The network upon receiving it, can easily deduce the absolute time for the problem event by correlating the time information with the known reference event.

Figure 3:
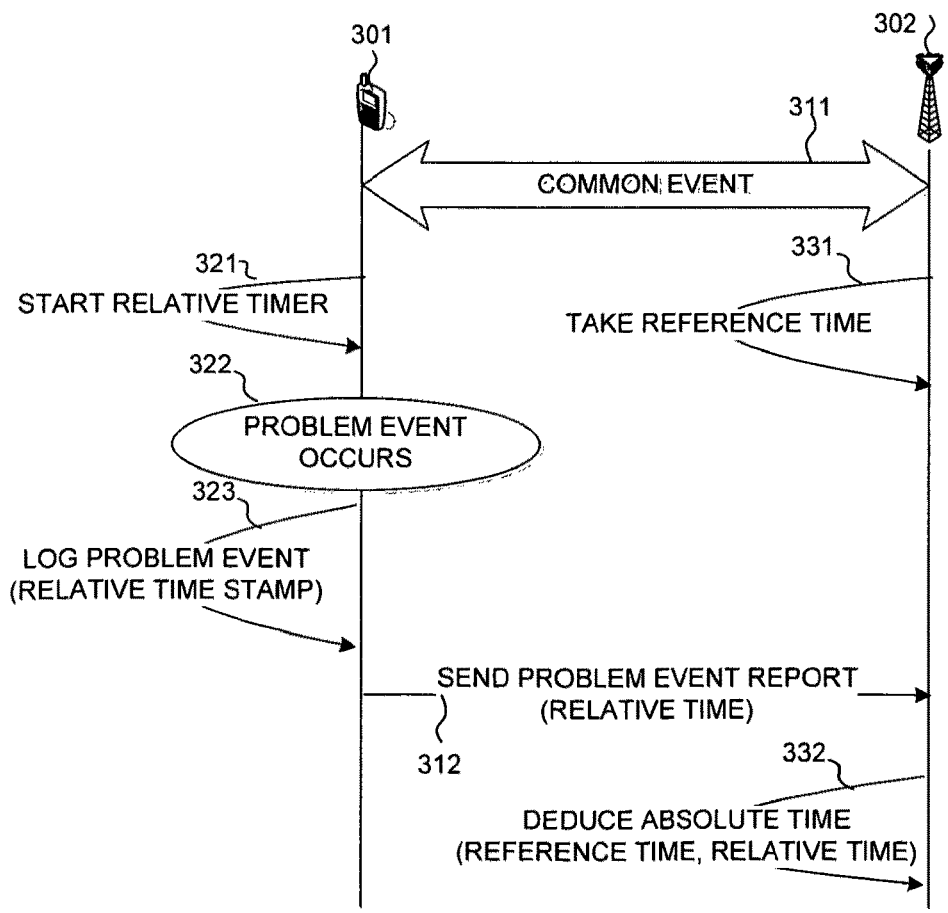
FIG. 3 shows one embodiment of the invention by using a common event known to both a user device and a network as a reference event.

FIG. 3 shows one embodiment of the present invention where a common event known to both a user device and a network is configured or predefined to be a reference event. At Step 311, a common event known to both UE 301 and eNB 302 occurs. UE 301, at Step 321 starts a relative timer and starts to count the elapsed time. It is well known to a person skilled in the art to understand that there are different ways to count the elapsed time. One example is to use built-in functions commonly available in UE chipsets these days, such as counting in time units corresponding to radio frames or transmission time intervals or fractions or multiples thereof. Other ways of real timer or time stamping the start time can also be used. UE 301 may use any means to note the common event occurrence time as well. At the same time, eNB 302, at Step 331, also takes notice of the common event and marks the reference time of the common event happened at Step 311. After a certain period, at Step 322, a problem event occurs. Upon detecting this problem event, at Step 323, UE 301 logs the problem event together with relative time information, which is the duration between the common event and the problem event. At Step 312, UE 301 sends a problem event report to eNB 302 with the relative time information. There can be gap between Step 323 and Step 312. At Step 332, upon receiving the problem event report, eNB 302 deduces the absolute time of the problem event by correlating the relative time information in the problem event report and the reference time of the common event it marked at Step 331. Therefore, the problem event is properly time stamped and presents useful information of the condition of the network at the time of the problem event occurred.

Figure 4:
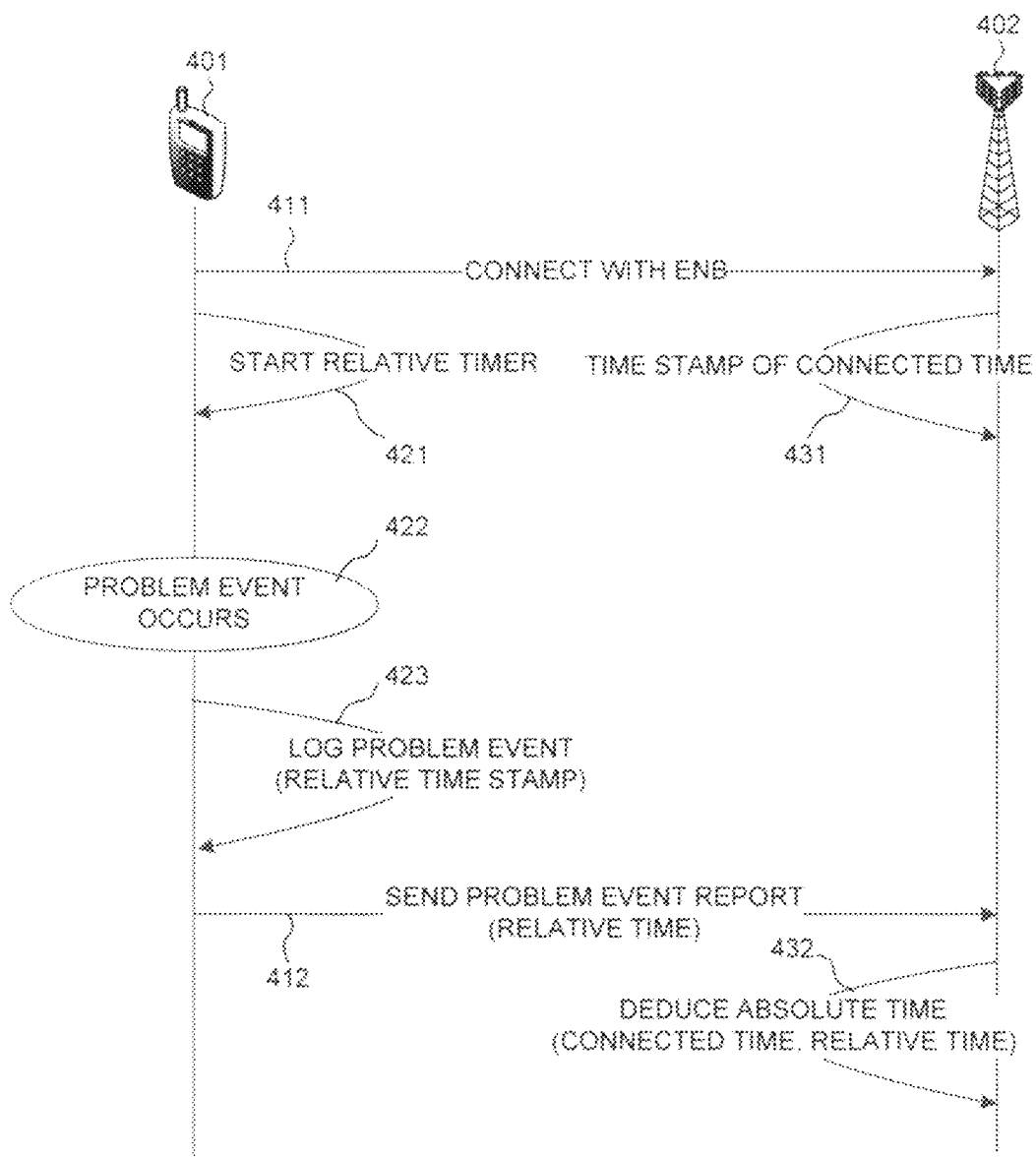
FIG. 4 shows a flow chart of one embodiment of the invention where a successful connection from a UE to a network is a reference event.

FIG. 4 shows a flow chart of one embodiment of the invention where a successful connection from a UE to a network node is a reference event. In this embodiment, a UE provides the duration between a time reference known to the cell where UE was last successfully connected before the problem event occurred, and the time of the problem event. As illustrated in FIG. 4, at Step 411, UE 401 is successfully connected to a cell served by eNB 402. At Step 421, UE 401 starts a relative timer to count its dwelling time in the cell served by eNB 402. The same as noted above, it is well known to a person skilled in the art that there are wide selections of ways of counting the elapsed time; all of which if properly implemented can get the dwelling time information. eNB 402, at Step 431, also takes note of the time of the successfully connection from UE 401. At Step 422, a problem event occurs. Assume the occurrence of the problem event is related to UE 401's leaving of eNB 402, or entering of another cell served by a different eNB. In either case, at Step 423, UE 401 logs the problem event with relative time information of its dwelling time duration with eNB 402. At Step 412, UE 401 sends a problem event report to eNB 402 (as shown in figure) or said different eNB with the relative dwelling time. Upon receiving the problem event report, at Step 432, eNB 402 or said different eNB and eNB 402 in cooperation deduces the absolute time of the problem event based on the commonly known event of last successful connection time and the relative time information in the problem event report.

The advantage of this specific embodiment of the present invention is apparent in a distributed architecture where each eNB or base station is responsible for its optimization process. In such architecture, problem event report must be fed back to the eNB that is most likely the one responsible for the problem. In most cases, such eNB is the last successfully connected eNB before the problem occurred. Here, we assume that the UE can provide the time of dwelling with the eNB. The dwelling time is the duration between the UE entering the cell until leaving. Normally, the problem event is very close in time and is related to either A) UE leaves the last known cell, or B) UE enters another cell. Typical feature that could use such principle would be Mobility Robustness Optimization (MOR) for Self Organizing Networks (SON). In actual implementation, a UE needs to identify itself so that it is possible to correlate to the known common event in its last connected previous cell. For example, in LTE, the RAN does not know the UE identities used in previous cells. Note that the cell where the UE was successfully connected before the problem event may also be controlled by another RAN node, different to the node where the UE does the problem event reporting. Therefore, a UE needs to provide addressing information to identify itself in the cell where the UE was last successfully connected before the problem event occurred, e.g., via the CRNTI or re-establishment authentication code.

Another problem with stored problem event reports is that the stored reports take up memory resources and after certain time the reporting is too old to be applicable. In other embodiments of the present invention, deadline timer is used to solve this problem. In one embodiment of the present invention, UE would not report a stored problem event report after a deadline timer for this particular problem event has expired. In another embodiment of the present invention, the UE can choose to keep or discard the problem event report.

Figure 5:
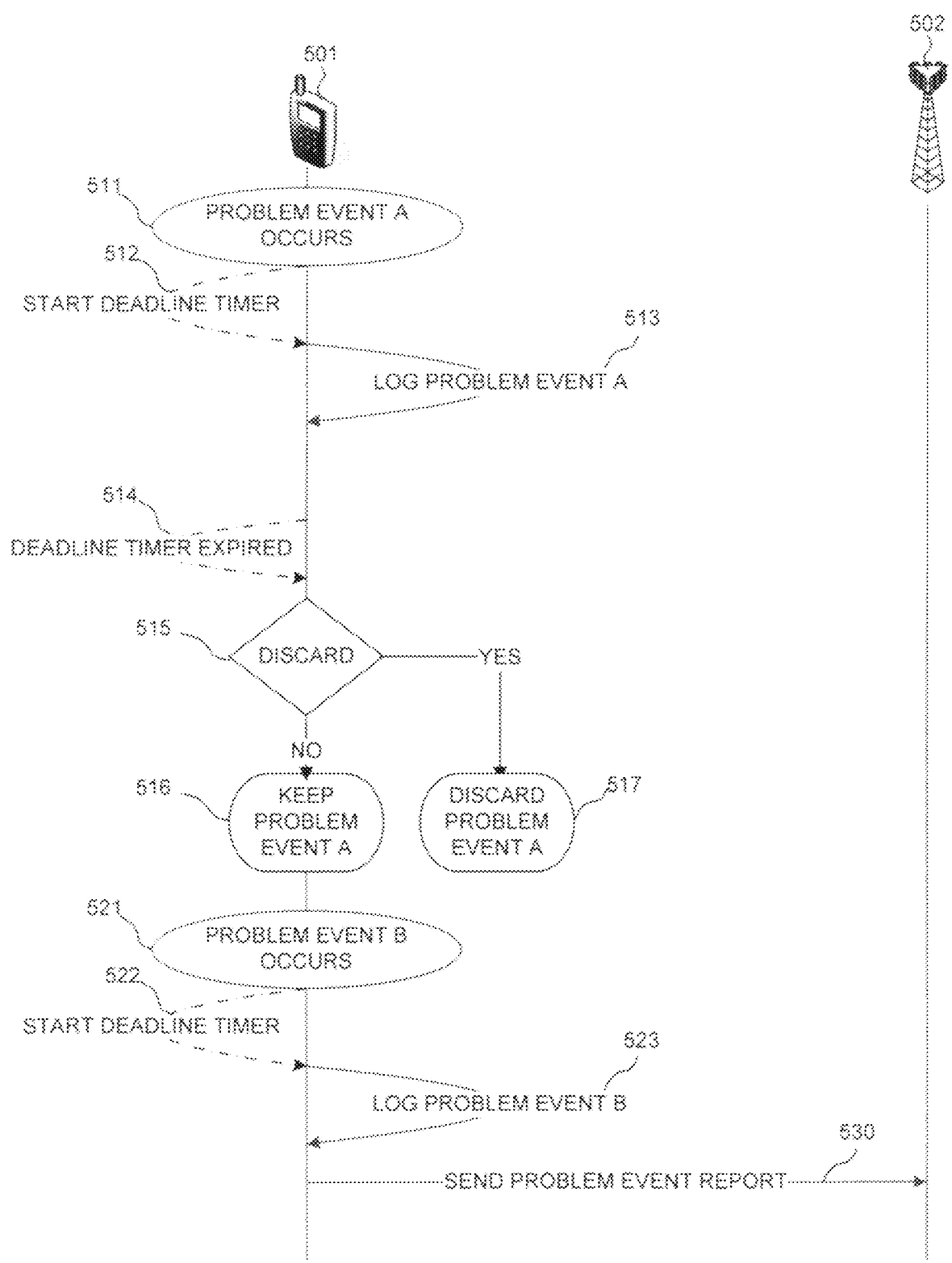
FIG. 5 shows a flow chart of one embodiment of the invention where a problem event deadline timer is configured.

FIG. 5 illustrates a flow chart of one embodiment of the invention where a problem event deadline timer is used. In this embodiment of the present invention, a UE would use a deadline timer for reporting the problem event, where the deadline timer is related to the occurrence of the problem event. FIG. 5 illustrates an exemplary scenario of this embodiment. At Step 511, UE 501 detects a problem event A. At Step 512, UE 501 starts a deadline timer. At Step 513, UE 501 logs this problem event A. Sometime later, At Step 514, the deadline timer expired and the problem event A is still not sent.

The expiration of a deadline timer indicates the stale of any unsent logged problem events. In one embodiment of the present invention, UE 501 will discard all the staled problem events. In another embodiment of the present invention, UE 501 can be adapted to choose to discard or keep the logged problem event. As shown in FIG. 5, at Step 515, UE 501 checks whether the problem event should be discarded. If UE 501 determines that it should be discarded, then problem event A is discarded at Step 517. If UE 501 is adapted to keep the problem events, then problem event A is kept at Step 516.

At Step 521, UE 501 detects another problem event B. At Step 522, UE 501 starts a deadline timer for problem event B. The UE can be configured or adapted to use one deadline timer for each problem event or use one deadline timer for multiple problem events. At Step 523, UE 501 logs this problem event B. Before the expiration of the deadline timer for problem event B, UE 501 sends a problem event report to eNB 502 at Step 530.

If UE 501 is configured or adapted to discard any stale reports, then the problem event report will contain only problem event B, but not problem event A. The problem event report may also include the time information of the deadline timer. Such deadline time information can also be predefined and is commonly known to both UE 501 and eNB 502. Upon receiving the problem event report, eNB 502 can deduce a time reference from the deadline time information from UE 501. Although eNB 502 may not get the exact time of problem event B, eNB 502 can deduce an upper bound of the time of the occurrence of the problem event, which is the expiration of the deadline timer.

This embodiment of the present invention makes it possible for the network to add a relatively accurate timestamp. It is useful especially in a network where the relevant configuration seldom changes, in which cases a relatively accurate timestamp would be sufficient. The advantage of this approach is simplicity. There is no additional signaling required.

Figure 6:
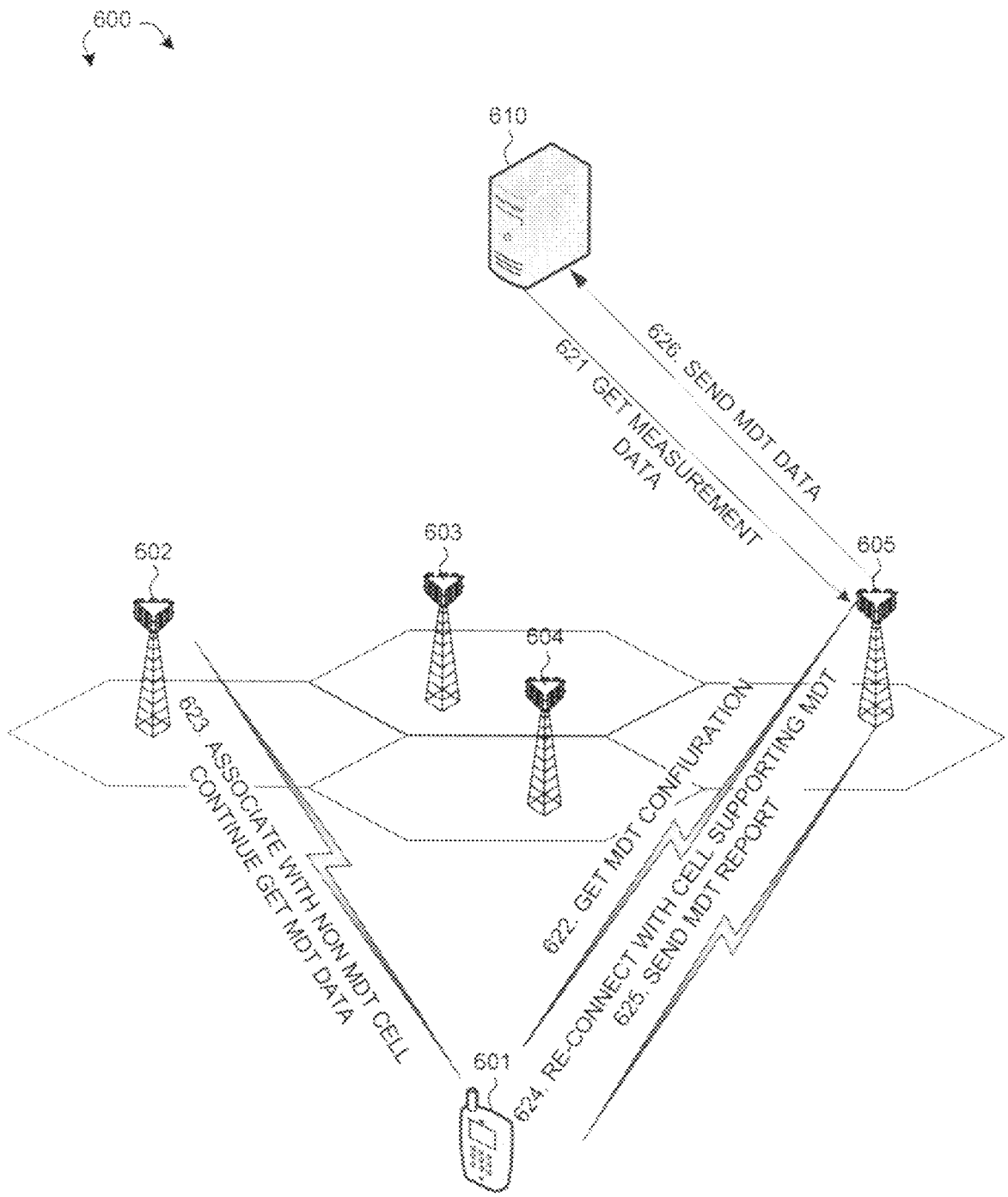
FIG. 6 schematically shows an architecture of a wireless communication network where MDT logging and reporting is used in a multiple Radio Access Technology (RAT) setting.

In another embodiment of the invention, an indicator is added to flag whether the network added time information would be accurate or not. An example is adding an indicator in the current immediate MDT report to signal a nonaccurate time stamping. FIG. 6 schematically illustrates architecture of a wireless communication network 600 where MDT logging and reporting is used in a multiple Radio Access Technology (RAT) setting. Network device 610 at Step 621 sends a get-measurement-data request to eNB 605, which is in a RAT that supports MDT. eNB 605 at Step 622 sends MDT configuration message to UE 601, which was connected with eNB 605. UE 601 starts MDT measurement and logging. At Step 623, UE 601 moved and was served with eNB 602, which is in a different RAT that does not support MDT. In these cases, UE 601 can either be connected with the new cell or camped there. UE 601, however, can continue MDT logging. At Step 624, UE 601 reconnected with eNB 605. At Step 625, UE 601 sends the MDT report back to eNB 605. This MDT report includes an indicator that the report is delayed. FIG. 6 illustrates an exemplary scenario of adding a delay-indicator to MDT. The trigger of including the delay-indicator can also be the event of UE 601 being served by a different public land mobile network (PLMN). The trigger can also be a delay of certain amount of time in sending the report after the problem event occurred. Such decision of adding a delay-indicator can also be configurable. UE 601 can also be designed to adapt to include newly defined triggering events to add this delay-indicator in its logging and reports.

The embodiments of the present invention as discussed above enable the network to better correlate problem event with its concurrent network condition.

Battery Condition Handling

To efficiently correlate time information with a problem event or a MDT report is an important aspect to improve network optimization. As MDT is developed in 3GPP standard to help getting coverage and other network planning information, how to efficiently handle battery condition for MDT becomes important. Since MDT is high energy consuming, improvement in battery handling for MDT is required.

Another main reason to introduce battery handling is user perception. For normal UEs and normal users, it is assumed that user perception has higher priority than UE activities for OAM purposes. UE's logging and recording in good battery condition is assumed to have little or no impact to user experience. User is anyway likely to charge UE battery quite often. UE's logging and recording in bad batter condition, however, is assumed to have significant impact to user experience. Users who have forgotten to charge the UE battery, or are travelling/moving without charging possibility can manage the battery performance to stretch limit. If adding OAM logging, the impact to battery life may be perceived as significant. Therefore, in order to support good user perception, the UE needs to implement battery handling for longer term for measurements and data collection, i.e., typically involving logging. The UE should take autonomous action based on battery condition, rather than being commanded by the network. The UE should stop activities for OAM purposes at low battery condition. The following embodiments of the invention provide ways to make the battery condition handling testable and more efficient.

Figure 7:
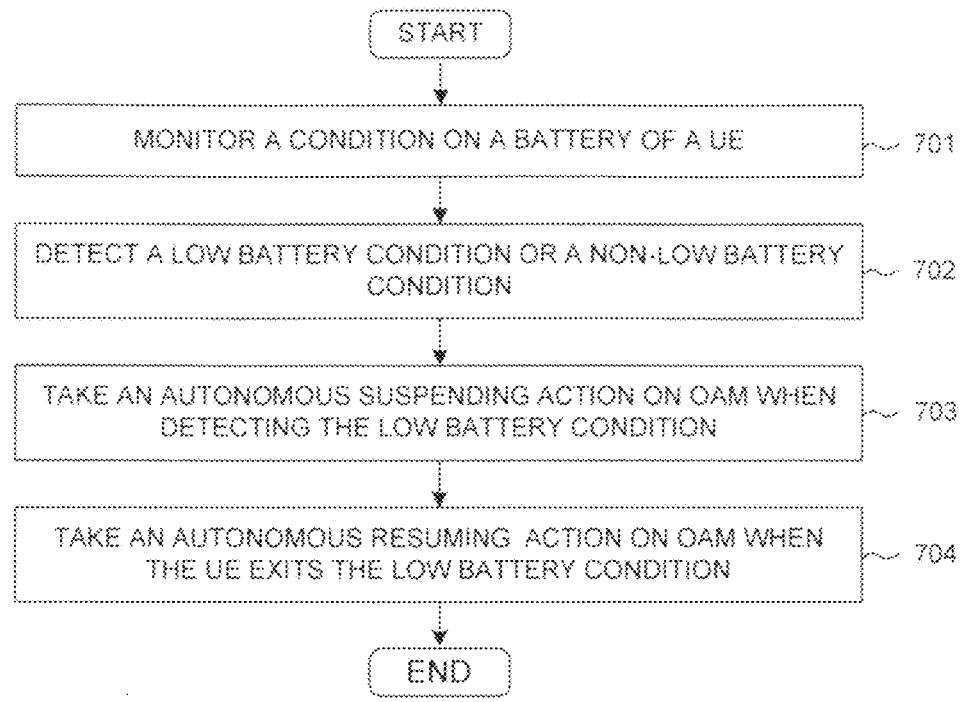
FIG. 7 shows a block diagram of one embodiment of the invention to handle low battery condition for MDT.

FIG. 7 shows flow chart of a method of using one embodiment of the invention to handle low battery condition for MDT. At Step 701, a UE performing OAM activities would monitor a condition on a battery of this UE. Typical OAM activities include logging in the device of information for network operation purposes, such as MDT, or observations and measurement reporting by the device. At Step 702, the UE detects a low battery condition or a non-low battery condition. At Step 703, the UE takes an autonomous suspending action on OAM activities when detecting the low battery condition. At Step 704, the UE takes an autonomous resuming action on OAM activities when the UE exits the low battery condition.

In one embodiment of the present invention, the UE upon suspending or resuming OAM activities may log information of a deliberate discontinuity to indicate that the gap in the log was intentional. Such information may further include the reason for the deliberate discontinuity, such as resource problem or battery problem. Such information will be included OAM activity logs and may be writing to persistent memory together with other OAM activity log information.

Figure 8:
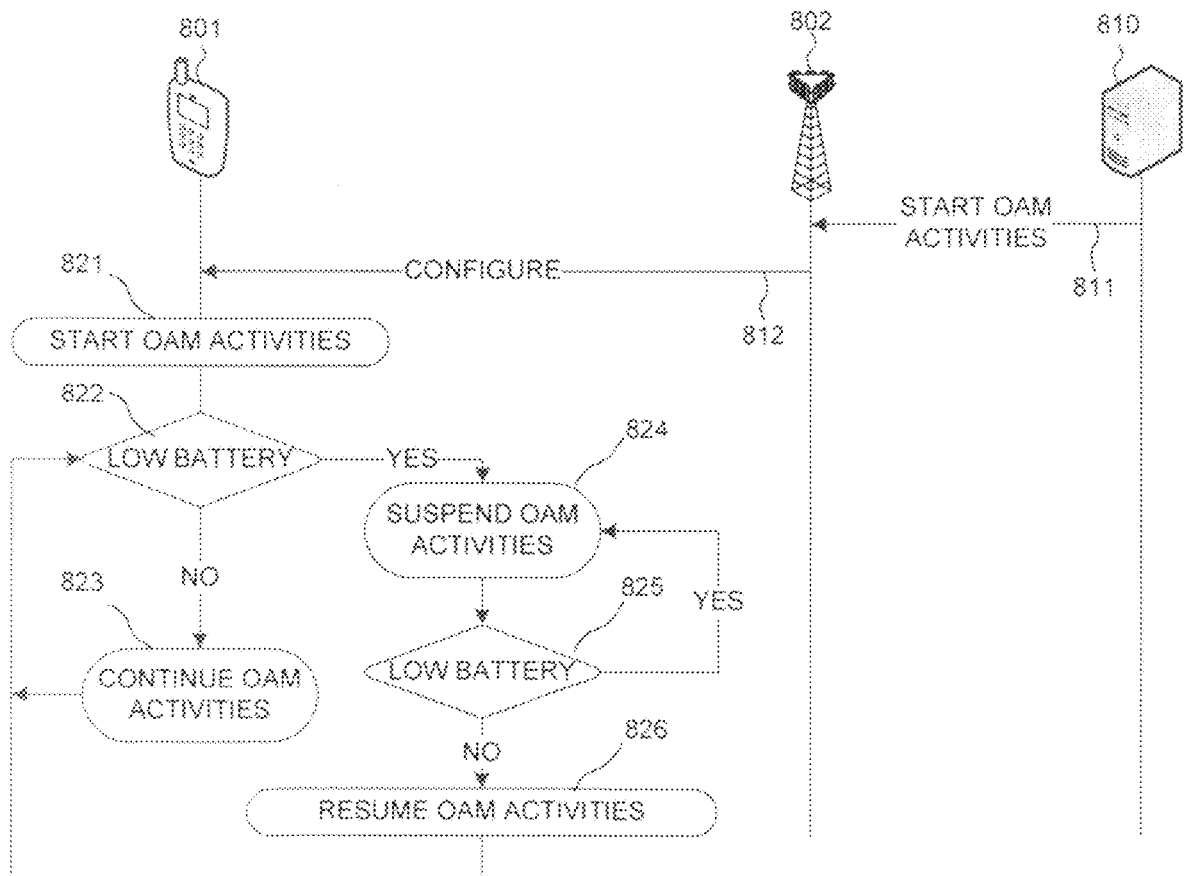
FIG. 8 shows flow chart of a method of using one embodiment of the invention to handle low battery condition for MDT.

FIG. 8 shows a block diagram of one embodiment of the invention to handle low battery condition for MDT. At Step 811, network device 810 sends a signaling message to eNB 802 to start OAM activities. At Step 812, eNB 802 sends an OAM configuration message to UE 801. After UE 801 starts OAM activities at Step 821, UE 801 monitors the battery condition by checking whether UE 801 is running on low battery condition at Step 822. In order to implement the low battery condition it should be testable. In general, the low battery condition is determined by combination of several aspects of information. If the UE is powered from an "unlimited" power source, such as a charger, then the UE is determined to be in non-low battery condition regardless of the battery level. On the other hand, if the UE is powered on limited power source, such as battery, then the low battery condition can be related to the remaining standby battery life. The low battery condition may also be related to user perception. It is assumed that significant user perception impact does not happen until remaining battery life is low. In one embodiment, the remaining standby battery life is an absolute number of standby hours left before the battery runs out (e.g., "4 hours standby time left"). In another embodiment of the present invention, the remaining battery life is a relative time, such as a percentage of standby battery life when fully charged (e.g., "10% of nominal standby time left").

If at Step 822, UE 801 concludes that the battery is not in a low-battery condition, then it continues OAM activities at Step 823 and then goes back to Step 822 to continue monitoring the battery condition. If, however, at Step 822, UE 801 detects low battery condition, then it will move to Step 824 to suspend OAM activities. UE 801 continues to monitor the battery condition after suspending OAM activities. At Step 825, UE 801 checks the battery condition. If the battery condition is low, UE 801 stays at Step 824 to suspend the OAM activities. If UE 801 exits the low battery condition, it moves to Step 826 to resume the OAM activities, and then goes back to Step 822 to repeat the entire process.

In one embodiment of the present invention, upon entering low battery condition, UE 801 tries to prevent loss of the collected data. This is especially advantageous in cases when a signal UE is tracked and collecting measurements for troubleshooting problems. For example, if UE 801 has created a MTD log with logging data, it initiates a connection to the network and indicates that there is a MDT log, to allow the network to fetch the log before the low battery condition gets so severe that the UE powers off. In another example, UE 801 stores its logging data into a persistent memory if such logging data exists. In yet another example, UE 801 stores OAM activity log together with logging data into a persistent memory upon low battery condition is detected.

Figure 9:
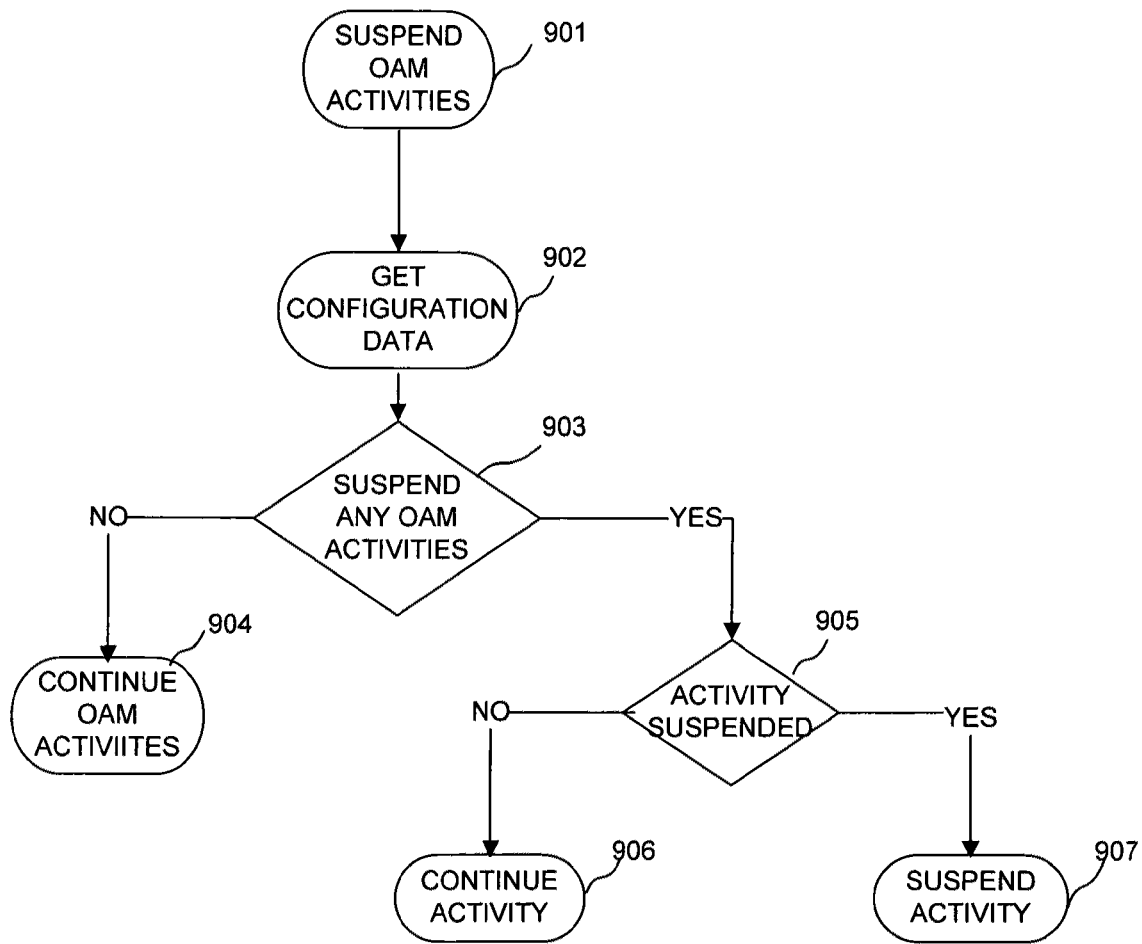
FIG. 9 shows a flow chart of one embodiment of the invention where the suspend-OAM-activities action is configurable.

In one embodiment of the invention, the suspension OAM activities action at Step 824 is configurable. FIG. 9 shows a flow chart of this embodiment where the suspend-OAM-activities action is configurable. At Step 901, when an UE detects low battery condition, it enters Suspend OAM activities action. Before UE blindly suspends all OAM activities, at Step 902, the UE get a set of configuration data. This configuration information can be passed down from the network, or embedded/predefined in the UE instruction. UE can also be configured to dynamically update this configuration information from either network commands or internal logic decisions. Once UE get the configuration data, at Step 902, it checks whether it is configured to suspend any OAM activities. In one embodiment of the invention, the UE can be configured to not suspend any OAM activities at all even under a low battery condition. In such case, at Step 904, UE continues with OAM activities. If Step 903 determines that UE needs to suspend some or all of the OAM activities, UE will act accordingly. Therefore, at Step 905, UE will determine if each of the OAM activities is to be suspended. If Step 905 determines that the activity is to be suspended, it carries Step 907 to suspend this OAM activity. If Step 905 determines not to suspend the OAM activity, UE will continue the OAM activity at Step 906.

In another embodiment of the present invention, the suspension action can be configured to suspend certain OAM activities but keep the other OAM activities running. For example, OAM configuration is kept, while OAM logging is suspended. In another embodiment of the invention, UE 801 can keep a plurality of OAM activity configuration timers running while OAM logging activities are suspended. Besides the above exemplary embodiments, UE 801 can be adapted to be configured to suspend other combination of activities while keep the rest running. In one novel aspect, Step 826 of Resume OAM Activities can be similarly configurable. UE would carry out similar steps to resume all or some the OAM activities based on configuration or predefined conditions.

The improved battery condition handling and the innovative steps of suspending and resuming OAM activities based on the battery condition helps to better use MDT for network planning and improves user perception. The present invention gives user or operator flexibility to set low battery condition by configuration. Such configuration can also be UE specific and gives the operators more flexibility. Furthermore, the innovative step of autonomously resuming OAM activities makes it easier for the network to implement an efficient configuration strategy. When a UE can be trusted to perform OAM activities for the whole OAM activity duration, then the network could configure UEs in the beginning of the duration and just wait. There would be no need for the network to re-configure the OAM activities to ensure resumption—the UE will autonomously resume OAM activities via its own battery condition handling. This is especially important in cases when a single specific UE is being tracked and asked to perform measurements and collect data. Note that it should be possible to exempt test UEs and test users from the battery handling.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   detecting, by a user equipment (UE), a reference event in a wireless network, the reference event being a common event known to the UE and a network device;
   detecting a problem event by the UE;
   determining, by the UE, a duration between an occurrence of the reference event and an occurrence of the problem event; and
   sending, by the UE to the network device, a problem event report to report the detected problem event, the problem event report including relative time information indicating the determined duration,
   wherein the method further comprises:
      detecting, by the UE, whether a battery of the UE is in a low-battery condition;
      suspending the sending the problem event report in response to detection of the battery of the UE being in the low-battery condition; and
      resuming the sending the problem event report after the battery of the UE exits the low-battery condition, and
   wherein the problem event report further includes a delayed report indicator that is added to indicate whether the sending the problem event report is delayed.

2. The method of claim 1, wherein the problem event is taking from the group consisting of a radio link failure (RLF), a handover (HO) failure, a random access channel (RACH) failure, an initial connection setup failure, a cell reselection failure, and a UE entering an out-of-service state.

3. The method of claim 1, further comprising:
   starting, by the UE, a timer in response to the detection of the reference event; and
   determining the duration between the occurrence of the reference event and the occurrence of the problem event according to the timer.

4. The method of claim 1, wherein the reference event includes a request of the problem event report, a successful camping of the UE to a base station before the problem event occurred, or the UE being served by a different radio access technology (RAT) or by a different public land mobile network (PLMN).

5. The method of claim 1, wherein the reference event is a successful camping of the UE to a base station before the problem event occurred.

6. A user equipment (UE), comprising:
   a processing circuit configured to:
      detect a reference event in a wireless network, the reference event being a common event known to the UE and a network device;
      detect a problem event; and
      determine a duration between the occurrence of the reference event and an occurrence of the problem event; and
   a transceiver configured to send a problem event report to the network device to report the detected problem event, the problem event report including relative time information indicating the determined duration,
   wherein the processing circuit is further configured to:
      detect whether a battery of the UE is in a low-battery condition;
      suspend the sending the problem event report in response to detection of the battery of the UE being in the low-battery condition; and
      resume the sending the problem event report after the battery of the UE exits the low-battery condition, and wherein the problem event report further includes a delayed report indicator that is added to indicate whether the sending the problem event report is delayed.

7. The UE of claim 6, wherein the problem event is taking from the group consisting of a radio link failure (RLF), a handover (HO) failure, a random access channel (RACH) failure, an initial connection setup failure, a cell reselection failure, and a UE entering an out-of-service state.

8. The UE of claim 6, wherein the processing circuit is further configured to:
   start a timer in response to the detection of the reference event; and
   determine the duration between the occurrence of the reference event and the occurrence of the problem event according to the timer.

9. The UE of claim 6, wherein the reference event includes a request of the problem event report, a successful camping of the UE to a base station before the problem event occurred, or the UE being served by a different radio access technology (RAT) or by a different public land mobile network (PLMN).

10. The UE of claim 6, wherein the reference event is a successful camping of the UE to a base station before the problem event occurred.

\* \* \* \* \*